US011971107B2

(12) United States Patent
Elz et al.

(10) Patent No.: US 11,971,107 B2
(45) Date of Patent: Apr. 30, 2024

(54) VALVE AND METHOD OF MAKING AND USING THE SAME

(71) Applicant: Saint-Gobain Performance Plastics L+S GMBH

(72) Inventors: Christian Elz, Unterpleichfeld (DE); Mike Schmiech, Walldürn (DE)

(73) Assignee: Saint-Gobain Performance Plastics L+S GMBH, Wertheim—Bettingen (DE)

( * ) Notice: Subject to any disclaimer, the term of this patent is extended or adjusted under 35 U.S.C. 154(b) by 0 days.

(21) Appl. No.: 18/059,617

(22) Filed: Nov. 29, 2022

(65) Prior Publication Data

US 2023/0167912 A1 Jun. 1, 2023

Related U.S. Application Data

(60) Provisional application No. 63/264,634, filed on Nov. 29, 2021.

(51) Int. Cl.
*F16K 11/052* (2006.01)
*F16K 11/044* (2006.01)

(52) U.S. Cl.
CPC ........ *F16K 11/0525* (2013.01); *F16K 11/044* (2013.01); *F16K 11/052* (2013.01); *Y10T 137/87812* (2015.04)

(58) Field of Classification Search
CPC .............. F01P 2007/146; F16K 11/052; Y10T 137/86847; Y10T 137/87708; Y10T 137/87788; Y10T 137/87812; Y10T 137/87748; Y10T 137/8782

USPC .......................................................... 123/41.1
See application file for complete search history.

(56) References Cited

U.S. PATENT DOCUMENTS

| | | | | |
|---|---|---|---|---|
| 117,493 | A | * | 7/1871 | Wetmore et al. ..... F16K 11/052 251/75 |
| 1,213,513 | A | | 1/1917 | Lohse |
| 2,161,813 | A | * | 6/1939 | Groeniger ............... E03C 1/108 137/493.1 |
| 2,230,775 | A | * | 2/1941 | Conway ................ F16K 11/168 49/94 |
| 2,503,639 | A | | 4/1950 | Snyder |
| 3,170,669 | A | | 2/1965 | Roos |
| 4,005,726 | A | * | 2/1977 | Fowler .................. F16K 31/002 335/146 |
| 4,267,880 | A | | 5/1981 | Jacquet |

(Continued)

FOREIGN PATENT DOCUMENTS

| | | | |
|---|---|---|---|
| CN | 202302165 U | 7/2012 | |
| DE | 10249448 A1 * | 5/2004 | ................ F01P 7/16 |

(Continued)

OTHER PUBLICATIONS

International Search Report and Written Opinion for PCT Application No. PCT/EP2022/083677, dated Mar. 13, 2023, 14 pages.

*Primary Examiner* — Robert K Arundale
(74) *Attorney, Agent, or Firm* — Abel Schillinger, LLP; Ann Palma

(57) ABSTRACT

A valve including a valve body including an inlet opening and a plurality of outlet openings; and an actuating gate adapted to seal at least one of the plurality of outlet openings, where the actuating gate is adapted to rotate eccentrically about a central axis while also translating in a direction perpendicular to the central axis upon actuation.

13 Claims, 2 Drawing Sheets

(56) References Cited

U.S. PATENT DOCUMENTS

| | | | |
|---|---|---|---|
| 4,627,567 A * | 12/1986 | Thorn | G05D 23/1333 |
| | | | 123/41.1 |
| 4,697,786 A | 10/1987 | Kennedy | |
| 5,056,758 A * | 10/1991 | Bramblet | F16K 41/046 |
| | | | 277/513 |
| 5,186,433 A | 2/1993 | Pausch | |
| 5,244,014 A * | 9/1993 | Lie | F16K 11/0525 |
| | | | 137/625.46 |
| 5,941,270 A * | 8/1999 | Nogle | F16K 11/052 |
| | | | 137/112 |
| 5,950,576 A | 9/1999 | Busato et al. | |
| 6,269,839 B1 * | 8/2001 | Wickham | A62B 9/02 |
| | | | 137/625.2 |
| 6,539,899 B1 * | 4/2003 | Piccirilli | F01P 7/167 |
| | | | 123/41.1 |
| 6,681,805 B2 | 1/2004 | McLane et al. | |
| 8,011,186 B2 | 9/2011 | McEwan et al. | |
| 8,864,105 B2 | 10/2014 | Xu et al. | |
| 9,500,299 B2 | 11/2016 | Morein et al. | |
| 2003/0051759 A1 * | 3/2003 | Schmidt | B60H 1/00485 |
| | | | 137/862 |
| 2016/0017846 A1 * | 1/2016 | Hodebourg | F02M 26/26 |
| | | | 137/625.44 |
| 2016/0017848 A1 * | 1/2016 | Hodebourg | F02M 26/70 |
| | | | 137/625.44 |
| 2017/0152957 A1 | 6/2017 | Roche et al. | |
| 2021/0040674 A1 * | 2/2021 | Al | D06F 58/20 |

FOREIGN PATENT DOCUMENTS

| | | | | |
|---|---|---|---|---|
| DE | 10304837 A1 | 8/2004 | | |
| DE | 112014003408 T5 | 4/2016 | | |
| FR | 3046448 A1 * | 7/2017 | | F02M 26/06 |
| JP | S52114319 U | 8/1977 | | |

\* cited by examiner

VALVE AND METHOD OF MAKING AND USING THE SAME

CROSS-REFERENCE TO RELATED APPLICATION(S)

This application claims priority under 35 U.S.C. § 119(e) to U.S. Provisional Application No. 63/264,634, entitled "VALVE AND METHOD OF MAKING AND USING THE SAME," by Christian ELZ et al., filed Nov. 29, 2021, which is assigned to the current assignee hereof and incorporated herein by reference in its entirety.

FIELD OF THE DISCLOSURE

The present disclosure relates to valves and methods of making and using the same.

RELATED ART

Valves can be utilized to restrict and control fluid flow between two or more fluid conduits. The valve industries continue to demand improvements in valve design to increase operational efficiencies and lifetime of the components, while saving space and weight, increasing degree of integration, increasing robustness, and optimizing cost within a valve application.

SUMMARY

In accordance with an aspect described herein, a valve can include a valve body including an inlet opening and a plurality of outlet openings; and an actuating gate adapted to seal at least one of the plurality of outlet openings, where the actuating gate is adapted to rotate eccentrically about a central axis while also translating in a direction perpendicular to the central axis upon actuation.

In accordance with another aspect described herein, an assembly can include a fluid reservoir; and a valve adapted to restrict fluid flow relative to the fluid reservoir, the valve including: a valve body including an inlet opening and a plurality of outlet openings; and an actuating gate adapted to seal at least one of the plurality of outlet openings, where the actuating gate is adapted to rotate eccentrically about a central axis, while also translating in a direction perpendicular to the central axis upon actuation.

In accordance with another aspect described herein, a method of operating a valve can include: moving fluid through an inlet opening of a valve body to a first outlet opening of the valve body; actuating a gate within the valve body by rotating the gate eccentrically about a central axis while also translating the gate in a direction perpendicular to the central axis to close the first outlet opening and open a second outlet opening; and moving fluid through the inlet opening of the valve body to the second outlet opening of the valve body.

BRIEF DESCRIPTION OF THE DRAWINGS

Embodiments are illustrated by way of example and are not intended to be limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The terms "generally," "substantially," "approximately," and the like are intended to cover a range of deviations from the given value. In a particular embodiment, the terms "generally," "substantially," "approximately," and the like refer to deviations in either direction of the value within 10% of the value, within 9% of the value, within 8% of the value, within 7% of the value, within 6% of the value, within 5% of the value, within 4% of the value, within 3% of the value, within 2% of the value, or within 1% of the value.

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the valve and fluid transport arts.

Figure 1A:
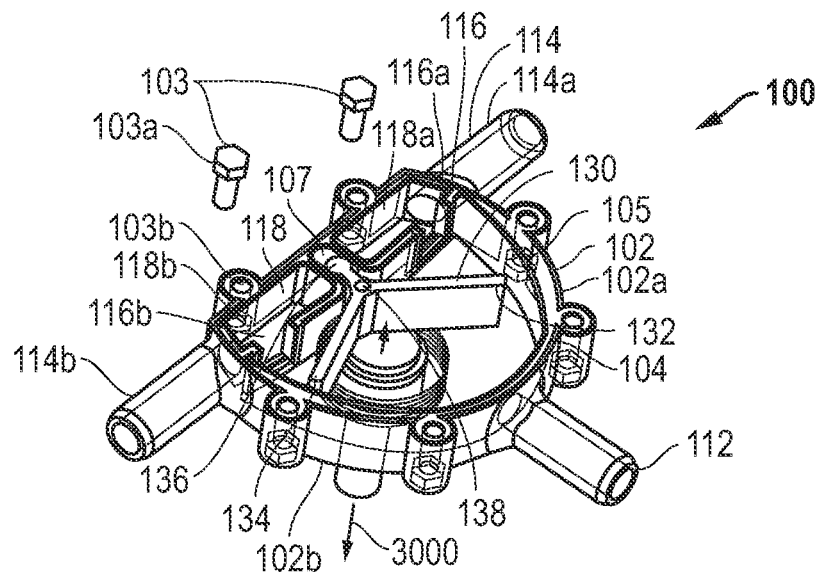
FIG. 1A includes a perspective cut-away view of a valve in accordance with an embodiment.

FIG. 1A includes a perspective view of a valve 100 in accordance with an embodiment. The valve 100 can generally include a valve body 102 and an actuating gate 130 disposed at least partially within the valve body 102. In an embodiment, the valve body 102 may include at least one inlet opening 112. In another embodiment, the valve body 102 may include a plurality of inlet openings 112. In an embodiment, the inlet openings 112 may have the same size and shape as one another. In an embodiment, the inlet openings 112 may have a different size and shape as one another. The valve body 102 may include at least one outlet opening 114. In another embodiment, the valve body 102 may include a plurality of outlet openings 114a, 114b. In an embodiment, the outlet openings 114a, 114b may have the same size and shape as one another. In an embodiment, the outlet openings 114a, 114b may have a different size and shape as one another. The plurality of outlet openings 114a, 114b may be disposed in a planar configuration, as shown in FIG. 1A. The plurality of outlet openings 114a, 114b may be disposed in a non-planar configuration, may be in a different orientation, or may be at different locations along the central axis 3000. In a number of embodiments, the actuating gate 130 can be adapted to rotate and/or translate within the valve body 102 to open a first outlet opening 114a and a second outlet opening 114b in a first configuration. The actuating gate 130 can be adapted to rotate and/or translate within the valve body 102 to move to open a first outlet opening 114a while closing a second outlet opening 114b in a second configuration. The actuating gate 130 can be adapted to rotate and/or translate within the valve body 102 to move to open a second outlet opening 114b while closing a first outlet opening 114a in a third configuration. In the first configuration, the valve 100 can permit fluid passage between the inlet opening 112 and the first outlet opening 114a and permit fluid passage between the inlet opening 112 and the second outlet opening 114b. In the second configuration, the valve 100 can permit fluid passage between the inlet opening 112 and the first outlet opening 114a while preventing fluid passage between the inlet opening 112 and the second outlet opening 114b. In the third configuration, the valve 100 can permit fluid passage between the inlet opening 112 and the second outlet opening 114b while preventing fluid passage between the inlet opening 112 and the first outlet opening 114a. In this way, the valve 100 may oscillate between the configurations.

In an embodiment, the at least one inlet opening 112 may form a rectilinear, polygonal, oval, circular, or arcuate cross-section for fluid passage. In an embodiment, the inlet opening 112 may form a circular cross-section for fluid passage. In an embodiment, the inlet opening 112 may form a tubing. In an embodiment, the at least one outlet opening 114 may form a rectilinear, polygonal, oval, circular, or arcuate cross-section for fluid passage. In an embodiment, the outlet opening 114 may form a circular cross-section for fluid passage. In an embodiment, the outlet opening 114 may form a tubing. In an embodiment, the at least one inlet opening 112 may have a larger cross-sectional area than the at least one outlet opening 114. In an embodiment, the at least one inlet opening 112 may have a smaller cross-sectional area than the at least one outlet opening 114. In an embodiment, the at least one inlet opening 112 may have substantially the same cross-sectional area as the at least one outlet opening 114.

Still referring to FIG. 1A, in an embodiment, the valve body 102 may include a sidewall 105. In an embodiment the valve body 102 may include a top portion 102a and a bottom portion 102b. The top portion 102a may couple with the bottom portion 102b to form the valve body 102. The top portion 102a may couple with the bottom portion 102b to form the valve body 102 by means of a fastener 103. The fastener 103 may include at least one of nuts, bolts, bearings, battens, buckles, clips, flanges, frogs, grommets, hook-and-eyes, latches, pegs, nails, rivets, tongue-and grooves, screw anchors, snap fasteners, stitches, threaded fasteners, ties, toggle bolts, wedges anchors, sonic weld, glue or adhesive, sealed, press-fit, or may be attached a different way. As shown in FIG. 1A, the fastener 103 may include bolts 103a adapted to fit into bores 103b within the top portion 102a and the bottom portion 102b where the bolts are adapted to secure the top portion 102a and the bottom portion 102b together. In a number of embodiments, the fastener 103 may provide a tight fit between the top portion 102a and the bottom portion 102b to provide a leak-proof valve body 102 adapted to prevent fluid from leaving the valve 100 outside of the outlet openings. In a number of embodiments, the top portion 102a and the bottom portion 102b may be adapted to provide minimal clearance between the actuating gate 130 and the other of the top portion 102a and bottom portion 102b. In other words, minimal fluid may not or may only minimally pass at an interface between the actuating gate 130 and the top portion 102a, or the actuating gate 130 and the bottom portion 102b in an axial direction defined by a central axis 3000. The valve 100 may be adapted to allow fluid to substantially only pass in a direction perpendicular to the axis 3000 (e.g. from the inlet opening 112 to the outlet opening 114).

Still referring to FIG. 1A, in an embodiment, the valve body 102 can include a valve chamber 104. The valve chamber 104 may at least partially or entirely house the actuating gate 130 and form the interface between the at least one inlet opening 112 and the at least one outlet opening 114. The valve chamber 104 may entirely house the actuating gate 130. In an embodiment the valve body 102 may include at least one outlet gate 116. The outlet gate 116 may be fluidly connected to the valve chamber 104 and an outlet opening 114. The outlet gate 116 may be a partition between the valve chamber 104 and the outlet opening 114 to be blocked by the actuating gate 130 during operation of the valve 100. In an embodiment, the at least one outlet gate 116 may be disposed on the sidewall 105 and directly adjacent to the outlet opening 114. In an embodiment, the at least one outlet gate 116 may be disposed interior to the sidewall 105. Optionally, in an embodiment, the at least one outlet gate 116 may form an outlet gate chamber 118 within the valve body 102 between the outlet gate 116 and the outlet opening 114. The outlet gate 116 may form a void with a rectilinear, polygonal, oval, circular, or arcuate cross-section. In an embodiment, as shown in FIG. 1A, the valve body 102 may include a plurality of outlet gates 116a, 116b including a plurality of openings 117a, 117b to a plurality of outlet chambers 118a, 118b. As shown in FIG. 1A, the plurality of outlet gates 116a, 116b may form rectilinear cross-sections. The valve body 102 (e.g. valve chamber 104) may further include a channel 107. The channel 107 may be located between adjacent outlet chambers 118a, 118b. In an embodiment, the channel 107 may form a rectilinear, polygonal, oval, circular, or arcuate cross-section.

Still referring to FIG. 1A, as stated above, the valve 100 may include an actuating gate 130. The actuating gate 130 may include a plurality of flanges. In an embodiment, the actuating gate 130 may include a first flange 132, a second flange 134, and a third flange 136 to form substantially a "Y" shape. In an embodiment, at least one of the flanges 132, 134, 136 can be generally planar. In a more particular embodiment, at least one of the flanges 132, 134, 136 can be planar. The flanges 132, 134, 136 may come together at a base 138. In an embodiment, the first flange 132 and the second flange 134 may be located within the valve chamber 104 and may be adapted to substantially prevent fluid flow through at least one of the plurality of outlet gates 116a, 116b to prevent or allow fluid passage to at least one of the outlet openings 114a, 114b upon actuation of the actuating gate 130 as explained in further detail below. In an embodiment, as shown in FIG. 1A, the third flange 136 may include an enlarged end portion. In an embodiment, the third flange 136 may be housed within the channel 107 where the channel 107 is uniquely shaped to allow axial translation and rotation (e.g. pendulum movement) of the third flange 136 within the channel 107. As a result, in an embodiment, the third flange 136 may be housed within the channel 107 allowing for translation of the actuating gate 130 in a direction perpendicular to the central axis 3000 upon actuation as explained in further detail below. In an embodiment, the flanges 132, 134, 136 may each have a different length. In an embodiment, at least two of the flanges 132, 134, 136 may have the same length. The length of the flanges 132, 134, 136 may be adapted to the size of the valve body 102.

Figure 1B:
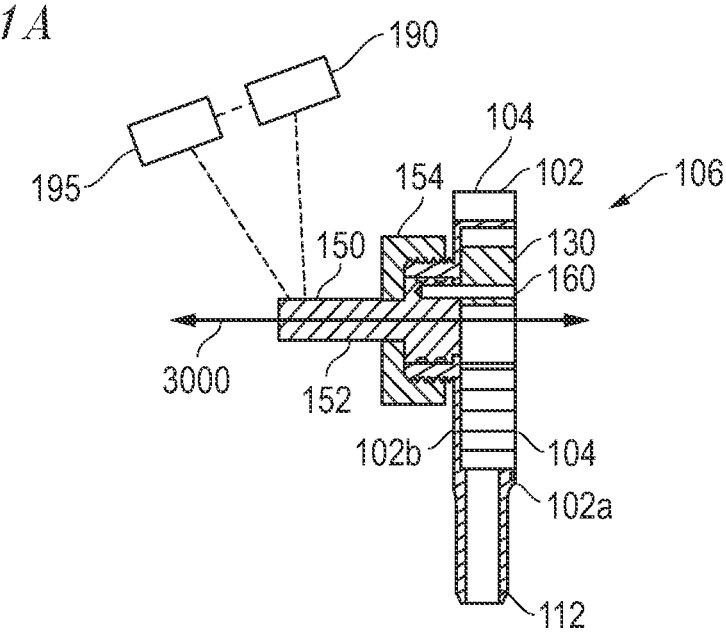
FIG. 1B includes a side cut-away view of a valve in accordance with an embodiment.

FIG. 1B includes a cut-away side view of a valve 100 in accordance with an embodiment. The components of the valve 100 of FIG. 1B may be substantially the same as those described above in FIG. 1A and correspondingly labeled relative to FIG. 1A, unless otherwise indicated. As shown in FIG. 1B, the central axis 3000 acts as a center of rotation for a driving mechanism 150. In a number of embodiments, the driving mechanism 150 may be a shaft adapted to rotate to correspondingly actuate (e.g. rotate and/or translate) the actuating gate 130 within the valve 100.

The drive mechanism 150 may further include a shaft 152 operatively connected to a power source 190 that supplies the power to rotate the shaft 152. The power source 190 may include a motor including, but not limited to an engine, a pneumatic motor, an electrical motor, a magnetic actuator, or may be another type. Further, in an embodiment, the drive mechanism 150 and/or motor 190 may further be operatively connected to an electronic control unit (ECU) 195 adapted to indicate power from the motor 190 should be applied to the drive mechanism 150 to rotate the actuating gate 130 and change fluid flow within the valve 100. The electronic control unit (ECU) 195 may include a controller, computer, or processor capable of understanding, analyzing, and/or implementing one or more programmable languages. The electronic control unit (ECU) 195 may be able to process the information provided by the valve 100 and/or information provided by a user. In an embodiment, the electronic control unit 195 may connect to the drive mechanism 150 through wires. In an embodiment, the electronic control unit 195 may connect to the drive mechanism 150 wirelessly. In an embodiment, the electronic control unit 195 may include a sensor adapted to sense a condition of the fluid within the valve 100. The sensor may be placed anywhere within the valve 200 and may be removable.

Still referring to FIG. 1B, the drive mechanism 150 may couple with the bottom portion 102b of the valve body 102 to form the valve 100. In another embodiment, the drive mechanism 150 may couple with the top portion 102a of the valve body 102 to form the valve 100. In a number of embodiments, the drive mechanism 150 may couple with the bottom portion 102b of the valve body 102 to form the valve 100 through a fastener 154. The fastener 154 may include at least one of nuts, bolts, bearings, battens, buckles, clips, flanges, frogs, grommets, hook-and-eyes, latches, pegs, nails, rivets, tongue-and grooves, screw anchors, snap fasteners, stitches, threaded fasteners, ties, toggle bolts, wedges anchors, or may be attached a different way. As shown in FIG. 1B, the fastener 154 may include threaded fasteners on the shaft 152 adapted to thread with threaded fasteners on the bottom portion 102 of the valve body 102 to secure the drive mechanism 150 and the bottom portion 102b together.

The shaft 152 of the drive mechanism 150 may still rotate within the drive mechanism 150 when it may be coupled with the bottom portion 102b of the valve body 102 through the fastener 154. In a number of embodiments, the drive mechanism 150 (e.g. shaft 152) may further include a pin 160. The pin 160 may be operatively coupled or attached to the base 138 of the actuating gate 130. In a number of embodiments, as shown in FIG. 1B, the pin 160 may fit within a bore on the base 138 of the actuating gate 130 to fixedly couple the drive mechanism 150 to the actuating gate 130. In a number of embodiments, as shown in FIG. 1B, the pin 160 may fit within a bore on the base 138 of the actuating gate 130 to fixedly couple the drive mechanism 150 to the actuating gate 130 a distance from the central axis 3000 (i.e. center of rotation of the drive mechanism 150). In this way, the bore of the base 138 of the actuating gate 130 may be coupled to the pin 160 eccentrically relative to the central axis 3000 (i.e. center of rotation of the drive mechanism 150). In this way, the actuating gate 130 is operatively connected to the drive mechanism 150 allowing for eccentric rotation and translation of the actuating gate 130, as explained in further detail below.

Figure 1C:
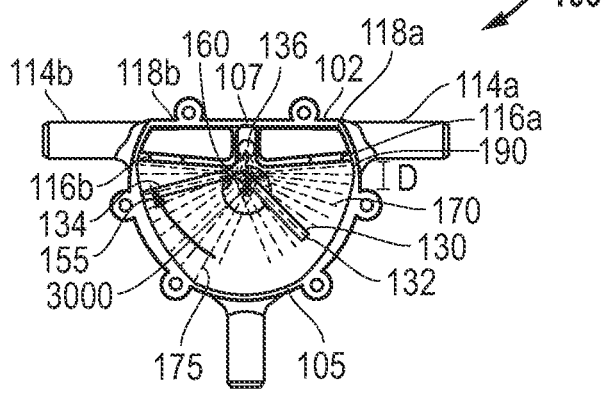
FIG. 1C includes a top cut-away view of a valve in accordance with an embodiment.

FIG. 1C includes a cut-away top view of a valve 100 in accordance with an embodiment. The components of the valve 100 of FIG. 1C may be substantially the same as those described above in FIGS. 1A-1B and correspondingly labeled relative to FIGS. 1A-1B, unless otherwise indicated. As shown in FIG. 1C, the central axis 3000 acts as a center of rotation for a driving mechanism. Through rotation of the drive mechanism, as described above, the actuating gate 130 may rotate eccentrically about the central axis 3000 due to the pin 160 (coupled to the bore 138 of the actuating gate 130) being offset from the center of rotation (i.e. central axis 3000) in a direction perpendicular to the central axis 3000 within the plane of the valve body 102, as indicated by distance, D. Further, due to the third flange 136 being located within the channel 107 of the valve body 102, the eccentric rotation of the actuating gate 130 may be aided by the translation of the actuating gate 130 in a direction perpendicular to the central axis 3000 upon actuation. In other words, the third flange 136 acts as an eccentric pendulum within the channel 107 that allows for eccentric rotation and translation of the actuating gate 130. It should be noted that the drive mechanism will rotate in a first direction about the central axis 3000 while the actuating gate 130 will actuate in the opposite direction about the central axis 3000 due to the interaction between the third flange 136 and the channel 107. The combined eccentric rotation and translation of the actuating gate 130 produces a locus of at least one of the first flange 132 or second flange 134 of the actuating gate 130, indicated by arrow 155. This linear locus is created due to the distance, D, between the base 138 of the actuating gate 130 and the central axis 3000, along with a distance between an axial end of the third flange 136 and the central axis 3000. These distances may be adapted to coincide with the dimensions of the valve body 102. The resulting eccentric rotation and translation movement of the actuating gate 130 is indicated by lines 170, mimicking the movement of the first flange 132 in moving from a second configuration to a first configuration and then to a third configuration; and lines 175, mimicking the movement of the second flange 134 in moving from a second configuration to a first configuration and then to a third configuration. In this way, the actuating gate 130 may be adapted for eccentric rotation and translation relative to the central axis 3000.

Still referring to FIG. 1C, the valve body 102 may be shaped to provide minimal clearance between the sidewall 105 and at least one of the first flange 132 or second flange 134 of the actuating gate 130 as it moves between configurations, such that the clearance between the sidewall 105 and at least one of the first flange 132 or second flange 134 of the actuating gate 130 may be 0 in the second and third configurations. In other words, the sidewall 105 of the valve body 105 may be designed or tailored (e.g. tapered) along the locus of at least one of the first flange 132 or second flange 134 of the actuating gate 130 so that a constant cross-sectional change between the respective flanges 132, 134 in the second and third configurations respectively may be made possible, resulting in fluid flow may be reduced to at least one of the outlet gates 116a, 116b as the actuating gate 130 moves. As a result, when the valve 100 is in a first configuration, the cross-sectional area on both sides of the valve chamber 104 is substantially the same size. In an embodiment, the sidewall 105 may include a locking mechanism 109 adapted to lock the actuating gate 130 in one of the second or third configurations. The locking mechanism 109 may be adapted to engage with the first flange 132 or the second flange 134 of the actuating gate 130 to selectively maintain the valve in a second or third configuration. In a number of embodiments, as shown in FIG. 1C, the locking mechanism 190 may include a barb, lip, stay, ramp, tab, textured/grippable surface, or clip on the sidewall 105 that provides a slot for the first flange 132 or the second flange 134 in a second or third configuration to somewhat restrict or retard rotation and/or axial translation of the actuating gate 130.

Figure 2A:
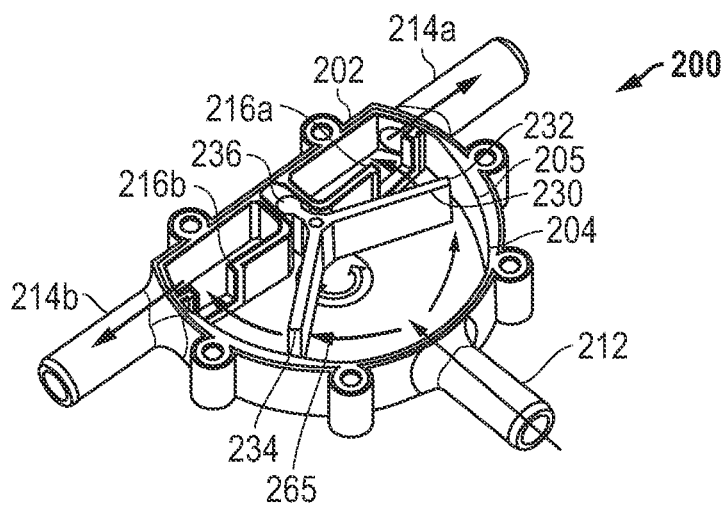
FIG. 2A includes a perspective cut-away view of a valve in a first configuration in accordance with an embodiment.
Figure 2B:
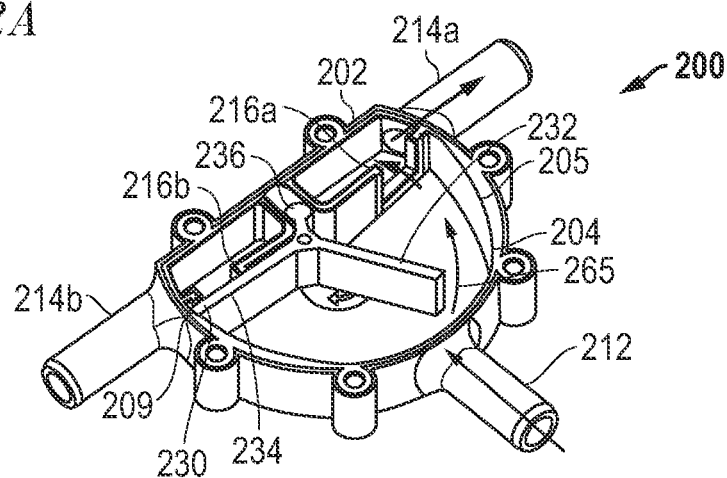
FIG. 2B includes a perspective cut-away view of a valve in a first configuration in accordance with an embodiment.
Figure 2C:
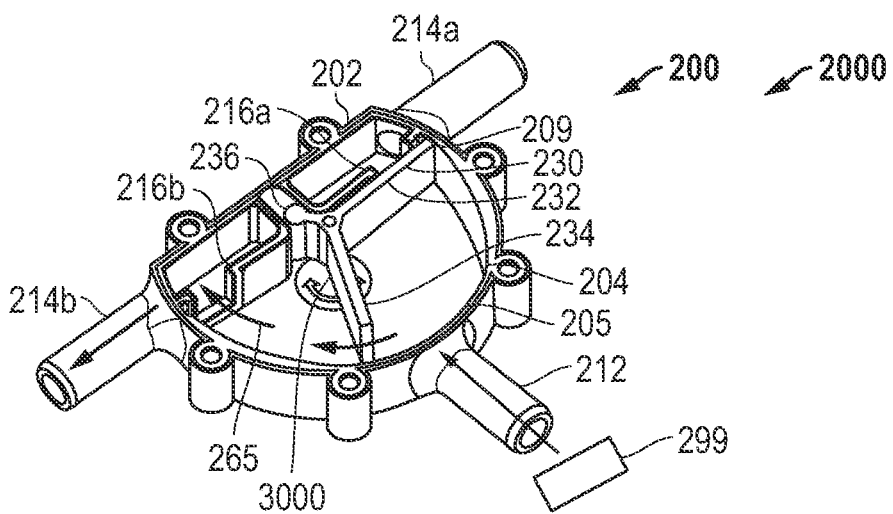
FIG. 2C includes a perspective cut-away view of a valve in a first configuration in accordance with an embodiment.

FIGS. 2A-2C includes a cut-away top view of a valve 200 in accordance with an embodiment. The components of the valve 200 of FIGS. 2A-2C may be substantially the same in functionality as those described above in FIGS. 1A-1C and correspondingly labeled relative to FIGS. 1A-1C, unless otherwise indicated. FIG. 2A shows the valve 200 in a first configuration as described above. FIG. 2B shows the valve 200 in a second configuration as described above. FIG. 2C shows the valve 200 in a third configuration as described above.

As shown in FIG. 2A, when the valve 200 is in a first configuration, the first flange 232 of the actuating gate 130 may be in a first (neutral) position to open the first outlet opening 214a and the second outlet opening 214b and allow fluid flow from the inlet opening 212 to the first outlet opening 214a and the second outlet opening 214b, as indicated by fluid flow arrows 265. In some embodiments, in the first configuration, the distance between the edge of the first flange 232 of the actuating gate and the sidewall 205 may be substantially similar to the distance between the edge of the second flange 234 of the actuating gate and the sidewall 205 so as to allow a substantially similar amount of fluid to pass evenly between the first outlet opening 214a and the second outlet opening 214b.

As shown in FIG. 2B, when the valve 200 is in a second configuration, the actuating gate 130 may be in a second position to open the first outlet opening 214a and close second outlet opening 114b and allow fluid flow from the inlet opening 212 to the first outlet opening 214a while preventing or impeding fluid flow to the second outlet opening 114b, as indicated by fluid flow arrows 265. As shown in FIG. 2B, the first flange 232 of the actuating gate 230 may have a wide clearance with the sidewall 205 of the valve chamber 204 and there may be a minimal or no clearance between the second flange 234 of the actuating gate 230 and the sidewall 205 of the valve chamber 204, as the second flange 234 is covering and/or providing a seal against the second outlet gate 216b. In an embodiment, the second flange 234 may be within the locking mechanism 209 in this configuration. Movement between the configurations may be done through the eccentric rotation and axial translation of the actuating gate 230 as described above.

As shown in FIG. 2C, when the valve 200 is in a third configuration, the actuating gate 130 may be in a third position to close the first outlet opening 214a and open the second outlet opening 114b and allow fluid flow from the inlet opening 212 to the second outlet opening 214b while preventing or impeding fluid flow to the first outlet opening 114a, as indicated by fluid flow arrows 265. As shown in FIG. 2C, the second flange 234 of the actuating gate 230 may have a wide clearance with the sidewall 205 of the valve chamber 204 and there may be a minimal or no clearance between the first flange 232 of the actuating gate 230 and the sidewall 205 of the valve chamber 204, as the first flange 232 is covering and/or providing a seal against the first outlet gate 216a. In an embodiment, the first flange 232 may be within the locking mechanism 209 in this configuration. Movement between the configurations may be done through the eccentric rotation and axial translation of the actuating gate 230 as described above.

In a number of embodiments, as shown in FIG. 2C, the valve 200 may be placed within an assembly 2000. The assembly 2000 may include a fluid reservoir 299 and a valve 200 adapted to restrict fluid flow relative to the fluid reservoir 299. The valve 200 may include a valve body 202 including an inlet opening 212 and a plurality of outlet openings 214a, 214b, and an actuating gate 230 adapted to seal at least one of the plurality of outlet openings 214a, 214b. The actuating gate 230 may be adapted to rotate eccentrically about a central axis 3000 while also translating in a direction perpendicular to the central axis 3000 upon actuation.

As described above, in a number of embodiments, a method of operating a valve 200 is shown. The method may include moving fluid 265 through an inlet opening 112 of a valve body 202 to a first outlet opening 114a of the valve body 202. The method may further include actuating a gate 230 within the valve body 202 by rotating the gate 230 eccentrically about a central axis 3000 while also translating the gate 230 in a direction perpendicular to the central axis 3000 to close the first outlet opening 114a and open a second outlet opening 114b. The method may further include moving fluid 265 through the inlet opening 112 of the valve body 202 to the second outlet opening 114b of the valve body 202.

The valve (including at least one of the valve body, the actuating gate, or the drive mechanism) can be formed from any suitable material in the valve arts. In a particular embodiment, the valve (including at least one of the valve body, the actuating gate, or the drive mechanism) can at least partially include a polymer. The polymer may be selected from the group including a polyketone, a polyaramid, a polyphenylene sulfide, a polyethersulfone, a polyphenylene sulfone, a polyamideimide, ultra high molecular weight polyethylene, a fluoropolymer, a polybenzimidazole, a polyacetal, polybutylene terephthalate (PBT), polypropylene (PP), polycarbonate (PC), Acrylonitrile butadiene styrene (ABS), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. The polymer may be a thermoplastic or thermosetting polymer. In an embodiment, the jacket 102 may include, or even consist essentially of, a fluoropolymer. Exemplary fluoropolymers include a polytetrafluoroethylene (PTFE), a polyether ether ketone (PEEK), a polyimide (PI), a polyamide-imide (PAI), a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Other fluoropolymers, polymers, and blends may be included in the composition of the valve. In another particular embodiment, the valve (including at least one of the valve body, the actuating gate, or the drive mechanism) can at least partially include, or even consist essentially of, a polyethylene (PE) such as an ultra-high-molecular-weight polyethylene (UHMWPE). In another particular embodiment, the valve (including at least one of the valve body, the actuating gate, or the drive mechanism) may include a thermoplastic elastomeric hydrocarbon block copolymer, a polyether-ester block co-polymer, a thermoplastic polyamide elastomer, a thermoplastic polyurethane elastomer, a thermoplastic polyolefin elastomer, a thermoplastic vulcanizate, an olefin-based co-polymer, an olefin-based ter-polymer, a polyolefin plastomer, or combinations thereof. In an embodiment, the valve (including at least one of the valve body, the actuating gate, or the drive mechanism) may include a styrene based block copolymer such as styrene-butadiene, styrene-isoprene, blends or mixtures thereof, and the like. Exemplary styrenic thermoplastic elastomers include triblock styrenic block copolymers (SBC) such as styrene-butadiene-styrene (SBS), styrene-isoprene-styrene (SIS), styrene-ethylene butylene-styrene (SEBS), styrene-ethylene propylene-styrene (SEPS), styrene-ethylene-ethylene-butadiene-styrene (SEEBS), styrene-ethylene-ethylene-propylene-styrene (SEEPS), styrene-isoprene-butadiene-styrene (SIBS), or combinations thereof. Commercial examples include some grades of Kraton™ and Hybrar™ resins. In an embodiment, the valve (including at least one of the valve body, the actuating gate, or the drive mechanism) may include an elastomer including at least one of Acrylonitrile-Butadiene (NBR) Carboxylated Nitrile (XNBR) Ethylene Acrylate (AEM, Vamac®), Ethylene Propylene Rubber (EPR, EPDM), Butyl Rubber (IIR), Chloroprene Rubber (CR), Fluorocarbon (FKM, FPM), Fluorosilicone (FVMQ), Hydrogenated Nitrile (HNBR), Perfluoroelastomer (FFKM), Polyacrylate (ACM), Polyurethane (AU, EU), Silicone Rubber (Q, MQ, VMQ, PVMQ), Tetrafluoroethylene-Propylene (AFLAS®) (FEPM).

In an embodiment, the valve (including at least one of the valve body, the actuating gate, or the drive mechanism) can include a ceramic including at least one of glass, silica, clay mica, kaolin, alumina, silica, titanium dioxide, calcium fluoride, boron nitride, mica, wollastonite, silicon carbide, silicon nitride, zirconia, carbon black, pigments, or any combination thereof.

In an embodiment, the valve (including at least one of the valve body, the actuating gate, or the drive mechanism) can at least partially include a metal. According to certain embodiments, the metal may include iron, copper, titanium, tin, aluminum, alloys thereof, or may be another type of metal. In an embodiment, the valve (including at least one of the valve body, the actuating gate, or the drive mechanism) can include a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof.

In an embodiment, the valve (including at least one of the valve body, the actuating gate, or the drive mechanism) can at least partially include a fibrous material. According to certain embodiments, the fibrous material could include cotton, wool, jute, linen, silk, hemp, polyester, nylon, asbestos, basalt, cellulose, yarn, rayon, or any combination thereof.

In an embodiment, the valve (including at least one of the valve body, the actuating gate, or the drive mechanism) can at least partially include a stone material. According to certain embodiments, the stone material could include stone, granite, limestone, tile, marble, sandstone, quartz, soapstone, alabaster, slate, clay, or any combination thereof.

In an embodiment, the valve (including at least one of the valve body, the actuating gate, or the drive mechanism) can be treated, impregnated, filled, or coated with a lubricious material. Exemplary lubricious materials include molybdenum disulfide, tungsten disulfide, graphite, grapheme, expanded graphite, boron nitrade, talc, calcium fluoride, or any combination thereof. Additionally, the lubricious material can include alumina, silica, titanium dioxide, calcium fluoride, boron nitride, mica, Wollastonite, silicon carbide, silicon nitride, zirconia, carbon black, pigments, or any combination thereof.

The valve may be used in any fluid flow application. The fluid may be a liquid, a gas, a solid, an emulsion, or may be another type. The fluid may be corrosive or non-corrosive. Particular suitable applications include valves within vehicle components, or other dynamic or static components requiring fluid flow therebetween.

Valves described according to embodiments herein may allow for the components of the valve to have a longer lifetime due to appropriately placed forces and precisely designed clearances that maximize valve operation. As a result, the lifetime of the components and the valve itself may be improved and overall leakage may be lessened. Further, valves according to embodiments herein may lessen actuation forces, which saves energy, increases efficiency, lowers cost and power consumption, and reduces size and weight of the valves.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1: A valve comprising: a valve body comprising an inlet opening and a plurality of outlet openings; and an actuating gate adapted to seal at least one of the plurality of outlet openings, wherein the actuating gate is adapted to rotate eccentrically about a central axis while also translating in a direction perpendicular to the central axis upon actuation.

Embodiment 2: The valve of embodiment 1, wherein the actuating gate comprises a Y-shape comprising a first flange, a second flange, and a third flange.

Embodiment 3: The valve of embodiment 2, wherein at least one of the first flange or the second flange are adapted to substantially prevent fluid flow through at least one of the plurality of outlet openings.

Embodiment 4: The valve of embodiment 2, wherein the third flange comprises an enlarged end portion.

Embodiment 5: The valve of embodiment 4, wherein the valve body comprises a channel at least partially housing the third flange allowing for translation of the actuating gate in a direction perpendicular to the central axis upon actuation.

Embodiment 6: The valve of embodiment 2, wherein the valve body comprises a sidewall, wherein the sidewall is adapted to provide minimal clearance between at least one of the first flange or the second flange.

Embodiment 7: The valve of embodiment 6, wherein the sidewall comprises a barb adapted to contact at least one of the first flange or the second flange.

Embodiment 8: The valve of embodiment 6, wherein the valve body comprises a plurality of outlet gates disposed interior to the valve body sidewall.

Embodiment 9: The valve of embodiment 8, wherein the plurality of outlet gates are fluidly connected to the plurality of outlet openings.

Embodiment 10: The valve of embodiment 1, wherein the actuating gate is operatively attached to a pin allowing for eccentric rotation of the actuating gate.

Embodiment 11: The valve of embodiment 10, wherein the pin is coupled to a shaft, allowing for eccentric rotation of the actuating gate.

Embodiment 12: The valve of embodiment 11, wherein the shaft is operatively connected to a power source comprising a motor adapted to actuate the actuating gate of the valve.

Embodiment 13: The valve of embodiment 11, wherein the shaft is operatively connected to an electronic control unit adapted to actuate the actuating gate of the valve.

Embodiment 14: The valve of embodiment 12, wherein the electronic control unit comprises a controller, computer, or processor.

Embodiment 15: The valve of embodiment 1, wherein the plurality of outlet openings are disposed in a planar configuration.

Embodiment 16: The valve of embodiment 1, wherein the at least one inlet opening comprises a plurality of openings.

Embodiment 17: The valve of embodiment 1, wherein valve body includes a top portion and a bottom portion adapted to provide minimal clearance between the actuating gate and the other of the top portion and bottom portion.

Embodiment 18: An assembly comprising: a fluid reservoir; a valve adapted to restrict fluid flow relative to the fluid reservoir, the valve comprising: a valve body comprising an inlet opening and a plurality of outlet openings; and an actuating gate adapted to seal at least one of the plurality of outlet openings, wherein the actuating gate is adapted to rotate eccentrically about a central axis, while also translating in a direction perpendicular to the central axis upon actuation.

Embodiment 19: A method of operating a valve comprising: moving fluid through an inlet opening of a valve body to a first outlet opening of the valve body; actuating a gate within the valve body by rotating the gate eccentrically about a central axis while also translating the gate in a direction perpendicular to the central axis to close the first outlet opening and open a second outlet opening; and moving fluid through the inlet opening of the valve body to the second outlet opening of the valve body.

Embodiment 20: The assembly of embodiment 18, wherein the assembly is located within a vehicle.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A valve comprising: a valve body comprising an inlet opening and a plurality of outlet openings; and an actuating gate adapted to seal at least one of the plurality of outlet openings, wherein the actuating gate is adapted to rotate eccentrically about a central axis while also translating in a direction perpendicular to the central axis upon actuation, wherein the actuating gate comprises a Y-shape comprising a first flange, a second flange, and a third flange.

2. The valve of claim 1, wherein at least one of the first flange or the second flange are adapted to substantially prevent fluid flow through at least one of the plurality of outlet openings.

3. The valve of claim 1, wherein the third flange comprises an enlarged end portion compared to end portions of the first and second flanges.

4. The valve of claim 3, wherein the valve body comprises a channel at least partially housing the third flange allowing for translation of the actuating gate in a direction perpendicular to the central axis upon actuation.

5. The valve of claim 1, wherein the valve body comprises a sidewall, wherein the sidewall is adapted to provide clearance between at least one of the first flange or the second flange.

6. The valve of claim 5, wherein the sidewall comprises a barb adapted to contact at least one of the first flange or the second flange.

7. The valve of claim 5, wherein the valve body comprises a plurality of outlet gates disposed interior to the valve body sidewall.

8. The valve of claim 1, wherein the actuating gate is operatively attached to a pin allowing for eccentric rotation of the actuating gate.

9. The valve of claim 8, wherein the pin is coupled to a shaft, allowing for eccentric rotation of the actuating gate.

10. The valve of claim 1, wherein the plurality of outlet openings are disposed in a planar configuration.

11. The valve of claim 1, wherein valve body includes a top portion and a bottom portion adapted to provide clearance between the actuating gate and the other of the top portion and bottom portion.

12. An assembly comprising: a fluid reservoir; a valve adapted to restrict fluid flow relative to the fluid reservoir, the valve comprising: a valve body comprising an inlet opening and a plurality of outlet openings; and an actuating gate adapted to seal at least one of the plurality of outlet openings, wherein the actuating gate is adapted to rotate eccentrically about a central axis, while also translating in a direction perpendicular to the central axis upon actuation, wherein the actuating gate comprises a Y-shape comprising a first flange, a second flange, and a third flange.

13. A method of operating a valve comprising: moving fluid through an inlet opening of a valve body to a first outlet opening of the valve body; actuating a gate within the valve body by rotating the gate eccentrically about a central axis while also translating the gate in a direction perpendicular to the central axis to close the first outlet opening and open a second outlet opening; and moving fluid through the inlet opening of the valve body to the second outlet opening of the valve body, wherein the actuating gate comprises a Y-shape comprising a first flange, a second flange, and a third flange.

\* \* \* \* \*